United States Patent
Lundsager

[11] 3,911,070
[45] Oct. 7, 1975

[54] PROFILE EXTENSION PROCESS FOR THERMOPLASTIC RESINS AND CERAMIC THERMOPLASTIC RESIN BINDER COMPOSITIONS

[75] Inventor: Christian Bent Lundsager, Ashton, Md.

[73] Assignee: W. R. Grace & Co., New York, N.Y.

[22] Filed: Dec. 5, 1974

[21] Appl. No.: 529,890

Related U.S. Application Data

[63] Continuation-in-part of Ser. No. 354,262, April 24, 1973, abandoned.

[52] U.S. Cl. .............. 264/44; 106/41; 260/2.5 E; 260/42.11; 264/45.3; 264/53; 264/54; 264/209; 264/DIG. 5; 264/DIG. 17
[51] Int. Cl.² .............. B29D 23/04; B29D 27/00; C04B 35/18
[58] Field of Search ........... 264/44, 209, 45.3, 54, 264/53, DIG. 17, DIG. 5; 260/42.11, 2.5 E; 106/41

[56] References Cited
UNITED STATES PATENTS

| | | | |
|---|---|---|---|
| 2,423,260 | 7/1947 | Slaughter | 264/209 X |
| 2,748,401 | 6/1956 | Winstead | 264/209 X |
| 2,952,041 | 9/1960 | Bernhardt | 264/DIG. 17 |
| 3,413,387 | 11/1968 | Ohsol | 264/46.3 X |
| 3,413,388 | 11/1968 | Lux et al. | 264/46.2 X |
| 3,474,048 | 10/1969 | Chappelear et al. | 264/DIG. 17 |
| 3,795,729 | 3/1974 | Asakura et al. | 264/46.3 X |

*Primary Examiner*—Philip Anderson
*Attorney, Agent, or Firm*—Joseph P. Nigon

[57] ABSTRACT

A process for preparing extrudates having one or more cavities is disclosed. The essential feature of the process is the inclusion of minor amounts of materials that are volatile or chemically decomposable at the extrusion temperature in the mix that is being extruded. The gases from the decomposition or volatilization are released when the extrudate leaves the die and maintain an internal pressure that prevents collapse of the structure.

7 Claims, 6 Drawing Figures

PROFILE EXTENSION PROCESS FOR THERMOPLASTIC RESINS AND CERAMIC THERMOPLASTIC RESIN BINDER COMPOSITIONS

This application is a continuation-in-part of Application Ser. No. 354,262, filed Apr. 24, 1973, and now abandoned.

BACKGROUND OF THE INVENTION

Extrusion of profiles containing one or more cavities is well known. Pipe is one example and other extrudates are known which have several cavities. It is, of course, necessary to prevent collapse of the walls of the extrudates during and on completion of the extrusion process. In the prior art processes, two methods were widely used to prevent this collapse. In one method, channels were provided through the die and a supply of air was provided to each cavity sufficient to maintain the internal pressure equal to or greater than the pressure external to the extruded profile.

Another prior art method of preventing collapse is to surround the profile as extruded with a suitable chamber in which a vacuum is maintained with the result that the internal pressure again is greater than the external pressure thus preventing collapse of the hollow profile.

If none of these methods are used, only short lengths of a satisfactory extrudate can be obtained before the internal pressure drops and the extrudate collapses in part or completely.

BRIEF DESCRIPTION OF THE INVENTION

I have found that the problem of collapse of the extrudate can be avoided and extended lengths of the extrudate can be prepared if the thermoplastics being extruded contains minor amounts (up to 2%) of a material that is volatile at the temperature of the extrusion or of a material that decomposes at extrusion temperatures. These volatile materials or blowing agents are released through all surfaces of the extrudate as the extrudate leaves the die. The gases resulting from the decomposition or volatilization are thus released in interior cavities of the extrudate and maintain the internal pressure and prevent collapse of the structure without using either the air blowing or vacuum methods described above. This process is particularly useful where the extrudates contain many internal channels of small dimensions. With many small channels, it becomes very difficult, if not impossible, to supply the air to each of the channels in the extrudate through the die because of both space limitations and the cooling effect of the air stream on the die. Also, with many cavities, the effect of external vacuum will be sufficient only to prevent collapse of the outermost layer of channels, but those channels not adjacent to the vacuum will be subject to collapse and in the case of horizontal extrusion sagging as well.

The process of my invention is applicable to structures wherein the cross sectional diameter of the channel or channels is in the range of 0.01 to 0.25 inches. It is obvious that if the diameter of the channels is greater than about 0.25 inches, the vacuum or air blowing techniques will give satisfactory results.

DETAILED DESCRIPTION OF THE INVENTION

Figure 3:
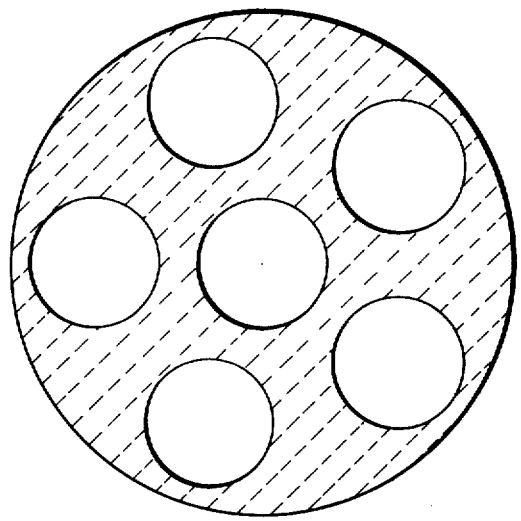

For purposes of simplicity, I will describe my invention with reference to the extrusion of a mixture consisting of a polyolefin, a plasticizer, and a filler to prepare an extended extrudate wherein the channels have a cross sectional diameter of 0.01 to 0.25 inches and having four to six of these channels. It is obvious, however, that the same principles are applicable to extrusion processes where different types of thermoplastic materials are used to form the extrudates.

In a typical extrusion using the process of my invention, the starting material consists of a ceramic powder such as alumina, cordierite, mullite, spinel, etc., a polyolefin, a plasticizer, and an agent that is volatile at the temperature of extrusion.

In a typical operation, the polymer and filler are blended together and the plasticizer is incorporated into the blend to provide good flow characteristics and to facilitate mixing without causing excessive loss of flexibility. The material volatile or decomposable at the extrusion temperatures is added to this mixture.

Each of the components, the polyolefin, the filler, the plasticizer, and the gas forming component are essential for retaining the desirable performance of the binder system. In a typical system the composition consists of 5 to 50 volume percent polyolefin, 5 to 60 volume percent plasticizer 20 to 50 volume percent cordierite or other ceramic powder, and 0.05 to 2 volume percent of the gas forming components. The preferred ranges are from 10 to 50 volume percent polyolefin, 20 to 60 volume percent plasticizer and 20 to 40 volume percent cordierite or other ceramic powder and 0.05 to 2 volume percent of the gas forming component.

Several plasticizers give satisfactory results. It is advantageous to use a plasticizer that is soluble in water.

The essential feature of the process is the inclusion of a material that is volatile or chemically decomposable at the extrusion temperature and thus generates a gas that prevents the extruded tubular structure from collapsing. The extrusion is normally carried out at a temperature of 280° to 380°F., preferably about 350°F. The gas forming material is either an organic material such as a blowing agent or an organic material that is volatile at the proper temperature. Examples of suitable volatile materials include: pentane, hexane, heptane, low boiling hydrocarbon oils and "Freon". Suitable blowing agents include hydrocarbon blowing agents and chemical blowing agents, such as azobisformamide. The plasticizer in the above formulations, such as the commercial oils, often contain small amounts of low boiling liquid which are sufficiently volatile at the extrusion temperature to practice the invention.

These gas forming materials are present as about 0.05 to 2 volume percent of the composition before extrusion with 0.1 to 0.5 being preferred.

Operation of the process by extrusion at temperatures high enough to volatilize a portion of the polymers such as polyethylene, for example, and thus provides a volatile material in situ is, of course, within the scope of this invention.

Figure 6:
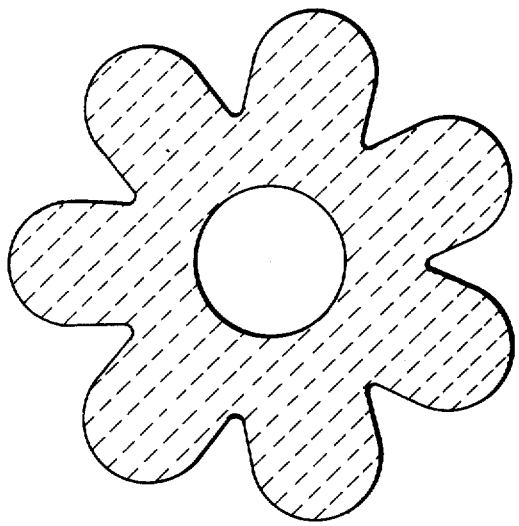
Figure 2:
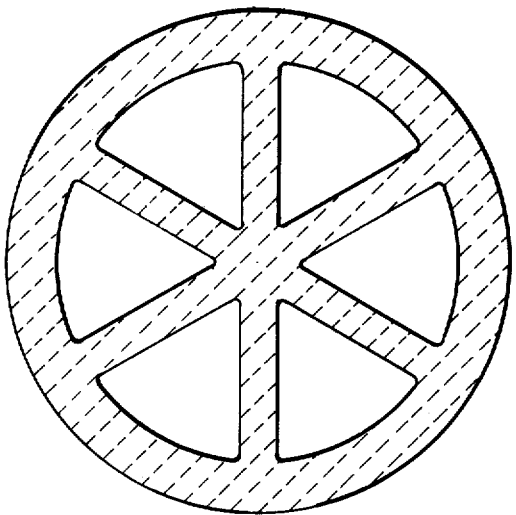
Figure 5:
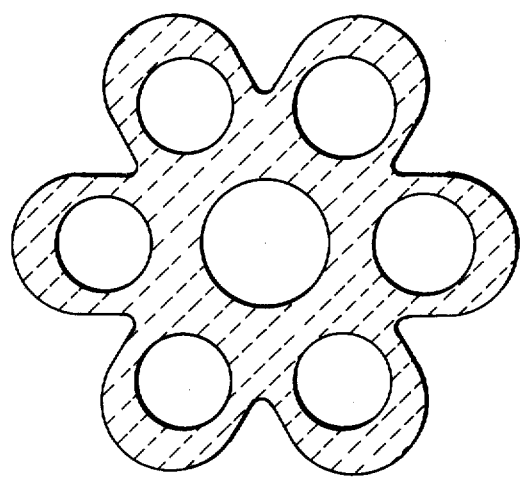
Figure 1:
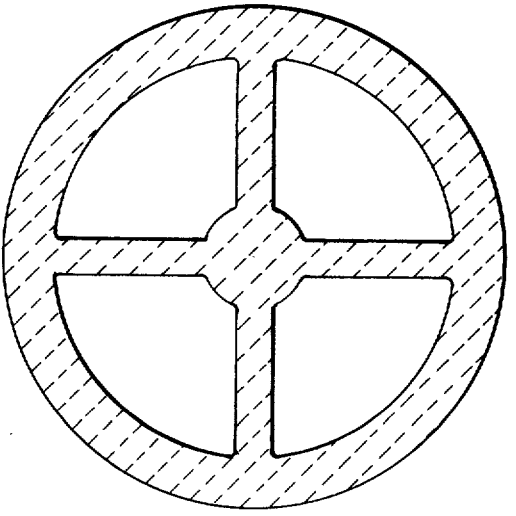
Figure 4:
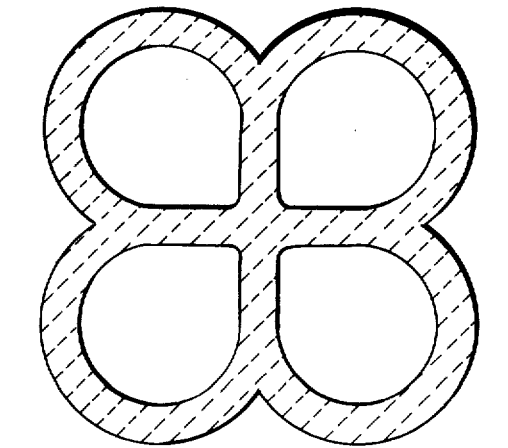

The figures show a variety of the different types of extrudates that lend themselves to preparation using the process of this invention. FIG. 4 shows a cross section of an extrudate wherein the extrusion mix contained about 2% of a commercially available blowing agent. FIGS. 2 and 3 show the more conventional type structures whereas FIGS. 4 and 5 and 6 show other possible variations of the extrudates that can be made in the instant process.

EXAMPLE 1

A cordierite filled polyethylene composition was made up by mixing 8.6 grams of particle formed linear polyethylene having a 0 melt index (SLMI), 76.8 grams of cordierite, 28.8 grams of mineral oil haivng a specific gravity of 0.9036 to 0.9071 at 15°C.; said mineral oil containing volatiles. Several batches of the raw materials were compounded to a homogeneous mass in a Brabender Plastograph at 350°F. After cooling, the mass was ground to a coarse powder. The composition was then extruded using a 1 inch diameter, 20 inch long single screw extruder having screw at 3 to 1 compression ratio where the extruder turned at 60 revolutions per minute. The extrusion was made at 350°F. through a die, one-fourth inch in diameter containing a mandrel to form a structure similar to the structure shown in FIG. 2. The extrudates were one-fourth inch in diameter and were cut into pellets about one-fourth inch long.

EXAMPLE 2

In this run, the raw materials were mixed as described in Example 1 using the same proportions. The crude mixture was heated to 350°F. and extruded as in Example 1. The extrudates were cut into pellets one-fourth inch long and the plasticizer removed by immersing the pellets into trichlorethylene at room temperature for about 2 hours. The pellets were then dried and heated to 240° to 700°C. over a period of 2 hours to burn off the polyethylene and were sintered at 1400°C. for about 2 hours.

There was no evidence of collapse of the extruded tube in either Examples 1 or 2.

EXAMPLE 3

A commercial low density polyethylene sold under the trade designation of DYNH-3 by Union Carbide Corporation was extruded under the same conditions as Example 1. The extrudate at start up had the desired cross section with cavities, but as extrusion was continued, the cavities were collapsed and the extrudate formed a solid rod. Without interupting the continuous extrusion the feed was changed to the composition of Example 1. The profile was restored as soon as the compound contained a partly volatile plasticizer began to replace the unplasticized polyethylene.

EXAMPLE 4

This example illustrates the use of azobisformamide (ABFA) as a blowing agent.

A quantity of the low density polyethylene described in Example 3 was mixed with 2 weight percent ABFA and extruded at a temperature of 400°F. The ABFA decomposes at this temperature and formed about 200 cubic centimeters of gases per gram of ABFA. The extrusion was made through a die to produce four cavities. The extruded polyethylene had the profile shown in FIG. 4, which was not only not collapsed, but actually expanded. This illustrates that as little as 2% of the ABFA blowing agent can generate volatiles in excess of the amount needed to prevent collapse of the extrudates.

What is claimed is:

1. In a process for continuously extruding thermoplastics in the form of a profile with one or more channels wherein each of said channels has a cross sectional diameter of about 0.01 to 0.25 inches, the improvement comprising including a material volatile at the extrusion temperature, selected from the group consisting of pentane, hexane, heptane and low boiling hydrocarbon oils to the plastic composition to prevent collapse of the profile during the extrusions and carrying out the extrusion at a temperature of about 200° to 600°F.

2. In a process for continuously extruding thermoplastics in the form of a profile with one or more channels wherein each of said channels has a cross sectional diameter of 0.01 to 0.25 inches; the improvement comprising including hydrocarbon blowing agents or chemical blowing agents decomposable at the extrusion temperature to the plastic composition to prevent collapse of the profile during the extrusion and carrying out the extrusion at a temperature of 200° to 600°F.

3. The process according to claim 2 wherein the blowing agent is azobisformamide.

4. The process according to claim 1 wherein the plastic is polyethylene containing a filler selected from the group consisting of cordierite, mullite, spinel and alumina.

5. A process for preparing a ceramic structure in the form of a profile with one or more cavities that maintains its integrity during and after extrusion which comprises:
   a. preparing a mixture made up of 5 to 50 volume percent of a polyolefin, 20 to 50 volume percent of a filler selected from the group consisting of cordierite, mullite, spinel, and alumina, 5 to 60 volume percent of a mineral oil plasticizer and 0.05 to 2.0 volume percent of a volatile material selected from the group consisting of pentane, hexane, heptane and low boiling hydrocarbon oils.
   b. heating the mixture from 200° to 500°F. and extruding the material through a die containing a mandrel to form a tubular extrudate having one or more cavities therein.
   c. cutting the extrudate into sections and extracting the plasticizer,
   d. heating to 300° to 700°C to burn off the polyolefin and,
   e. sintering at temperatures of 1400° to 1700°C. and recovering the product.

6. The process according to claim 5 wherein the polyolefin is polyethylene and the mineral oil plasticizer is extracted by immersing the extrudates in trichloroethane.

7. A process for preparing a ceramic structure in the form of a profile with one or more cavities that maintains its integrity during and after extrusion which comprises:
   a. preparing a mixture made up of 10 to 50 volume percent of a polyolefin, 20 to 40 volume percent of a filler selected from the group consisting of cordierite, mullite, spinel, and alumina, 20–60 volume percent of a mineral oil plasticizer and 0.05 to 0.2 volume percent of a blowing agent selected from the group consisting of hydrocarbon blowing agents and azobisformamide,
   b. heating the mixture from 200° to 500°F. and extruding the material through a die containing a mandrel to form a tubular extrudate having one or more cavities therein,
   c. cutting the extrudate into sections and extracting the plasticizer,
   d. heating to 300° to 700°C. to burn off the polyolefin and,
   e. sintering at a temperature of 1400° to 1700°C and recovering the product.

* * * * *

UNITED STATES PATENT OFFICE
CERTIFICATE OF CORRECTION

PATENT NO. : 3,911,070
DATED : October 7, 1975
INVENTOR(S) : Christian Bent Lundsager It is certified that error appears in the above-identified patent and that said Letters Patent are hereby corrected as shown below:

On page 1, the title:

"Profile Extension Process For Thermoplastic Resins And Ceramic Thermoplastic Resin Binder Compositions"

should read:

"Profile Extrusion Process For Thermoplastic Resins And Ceramic Thermoplastic Resin Binder Compositions".

In column 1, the title:

"Profile Extension Process For Thermoplastic Resins And Ceramic Thermoplastic Resin Binder Compositions"

should read:

"Profile Extrusion Process For Thermoplastic Resins And Ceramic Thermoplastic Resin Binder Compositions".

Signed and Sealed this first Day of June 1976

[SEAL]

Attest:

RUTH C. MASON
Attesting Officer

C. MARSHALL DANN
Commissioner of Patents and Trademarks